US009347733B2

(12) United States Patent
Brooks

(10) Patent No.: US 9,347,733 B2
(45) Date of Patent: May 24, 2016

(54) ROTARY AUGER BOW STAND

(71) Applicant: Kevin Brooks, Leitchfield, KY (US)

(72) Inventor: Kevin Brooks, Leitchfield, KY (US)

( * ) Notice: Subject to any disclaimer, the term of this patent is extended or adjusted under 35 U.S.C. 154(b) by 0 days.

(21) Appl. No.: 14/121,468

(22) Filed: Sep. 9, 2014

(65) Prior Publication Data

US 2015/0108322 A1 Apr. 23, 2015

Related U.S. Application Data

(63) Continuation-in-part of application No. 13/998,981, filed on Dec. 30, 2013.

(60) Provisional application No. 61/960,068, filed on Sep. 9, 2013, provisional application No. 61/848,248, filed on Dec. 29, 2012, provisional application No. 61/848,252, filed on Dec. 29, 2012, provisional application No. 61/848,253, filed on Dec. 29, 2012, provisional application No. 61/855,853, filed on May 28, 2013.

(51) Int. Cl.
*F41B 5/14* (2006.01)
*F16M 13/02* (2006.01)
*A01M 31/00* (2006.01)

(52) U.S. Cl.
CPC .............. *F41B 5/1453* (2013.01); *A01M 31/00* (2013.01); *F16M 13/022* (2013.01)

(58) Field of Classification Search
CPC ...... A01K 1/04; A01K 27/004; F41B 5/1423; F16M 13/022; A01M 31/00
See application file for complete search history.

(56) References Cited

U.S. PATENT DOCUMENTS

| 32,226 | A | * | 4/1861 | Dotson | ........................... 70/427 |
| 1,562,343 | A | | 11/1925 | Post | |
| 2,447,444 | A | | 8/1948 | Waite | |
| 2,563,159 | A | * | 8/1951 | Clark | .............................. 40/664 |
| 2,901,789 | A | | 9/1959 | Frank | |
| 3,688,454 | A | | 9/1972 | Wolfcarius | |
| 6,116,760 | A | * | 9/2000 | Cox | .............................. 362/431 |
| 6,698,132 | B1 | | 3/2004 | Brint | |
| 6,810,630 | B2 | | 11/2004 | Chizmas | |
| 6,901,693 | B1 | | 6/2005 | Crowe | |
| D550,071 | S | | 9/2007 | Powell | |
| D554,980 | S | * | 11/2007 | Mihelis | ......................... D8/356 |
| 7,493,873 | B2 | * | 2/2009 | Petersen | ....................... 119/789 |
| 8,230,638 | B1 | | 7/2012 | Dunaway | |
| 2005/0268522 | A1 | | 12/2005 | Foster | |
| 2014/0332645 | A1 | * | 11/2014 | Brooks | ......................... 248/156 |

* cited by examiner

*Primary Examiner* — Amy Sterling
(74) *Attorney, Agent, or Firm* — Carrithers Law Office, PLLC

(57) ABSTRACT

A rotary auger bow mounting stand for removably holding a bow upright on the ground. The stand includes an upright rod with a helical coil or flights forming an auger base having a point at the lower distal end to be fixedly and removably screwed into the ground to support the stand in an upright position. The top end of the rod forming the stand body defines an S-shaped loop configured, sized and shaped and disposed at a selected angle to support a the arm of a bow holding the bow in a substantially vertical position above the ground. The integral loop which supports the is bow forms a handle for the purpose of rotating the auger into the ground.

14 Claims, 3 Drawing Sheets

US 9,347,733 B2

ROTARY AUGER BOW STAND

CROSS REFERENCE TO RELATED APPLICATIONS

This application is a continuation in part of U.S. application Ser. No. 13/998,981 filed on Dec. 30, 2013 and claims priority from U.S. Provisional Application Ser. No. 61/960,068 filed on Sep. 9, 2013 and U.S. Provisional Application Ser. No. 61/848,248 filed on Dec. 29, 2012 and U.S. Provisional Application Ser. No. 61/848,252 filed on Dec. 29, 2012 and U.S. Provisional Application Ser. No. 61/848,253 filed on Dec. 29, 2012 and U.S. Provisional Application Ser. No. 61/855,583 filed on May 28, 2013 all of which are incorporated by reference herein in their entirety.

TECHNICAL FIELD

The present invention relates to a rotary stake stand for supporting a bow in an upright position in the ground.

BACKGROUND OF THE INVENTION

Reaching for a bow in a ground blind can cause a lot of unnecessary sound and movement, spoking the game before the hunter can even draw back the bow string. The portable and reusable auger bow holder of the present invention includes an integrated loop handle which can be installed in the ground with no tools by twisting and rotating the handle screwing the auger base into the ground providing a bow support to hold the bow about 8 inches from the ground for quick and easy accessibility.

SUMMARY OF THE INVENTION

A rotary auger bow mounting stand for removably holding a bow upright on the ground. The stand includes an upright rod with a helical coil or flights forming an auger having a point at the lower distal end to be fixedly and removably screwed into the ground to support the stand in an upright position. The top end of the rod forming the stand body defines an S-shaped loop configured, sized and shaped and disposed at a selected angle to support a the arm of a bow holding the bow in a substantially vertical position above the ground. The integral loop which supports the is bow forms a handle for the purpose of rotating the auger into the ground.

It is an object of this invention to provide a portable and reusable bow holder stand which includes a helical coil at one end which can be screwed into the ground.

It is an object of this invention to provide a bow support stand which includes an integral crank handle for the purpose of screwing the stand into the ground.

It is an object of this invention to provide an integral crank handle for the purpose of screwing the stand into the ground wherein the crank handle services to support the arm of a bow substantially vertically with respect to the ground.

It is another object of the present invention to provide a bow holder wherein the integral handle serves to support the bow in a rested position.

It is another object of the present invention to provide a integrated handle with sound dampening sleeve composed of a fabric, polymer, rubber, or elastomer to cover a selected portion of the bow rest.

It is another object of the present invention to provide an integral handle bow rest at an upper end of a shaft extending upwardly from the spiral auger wherein the handle bow rest can be bent at a selected angle to hold the bow in a selected position with respect to the surface of the ground.

The present invention is for a rotary auger bow stand comprising or consisting of an elongated vertical rod having a helical spiral coil extending downward therefrom a selected distance for penetration into the ground, and at least one "S" shaped loop extending from a top portion of said rod comprising at least two looped sections spaced apart from and in vertical alignment with one another for receiving an arm of a bow.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figures 1, 2, 3, 4:
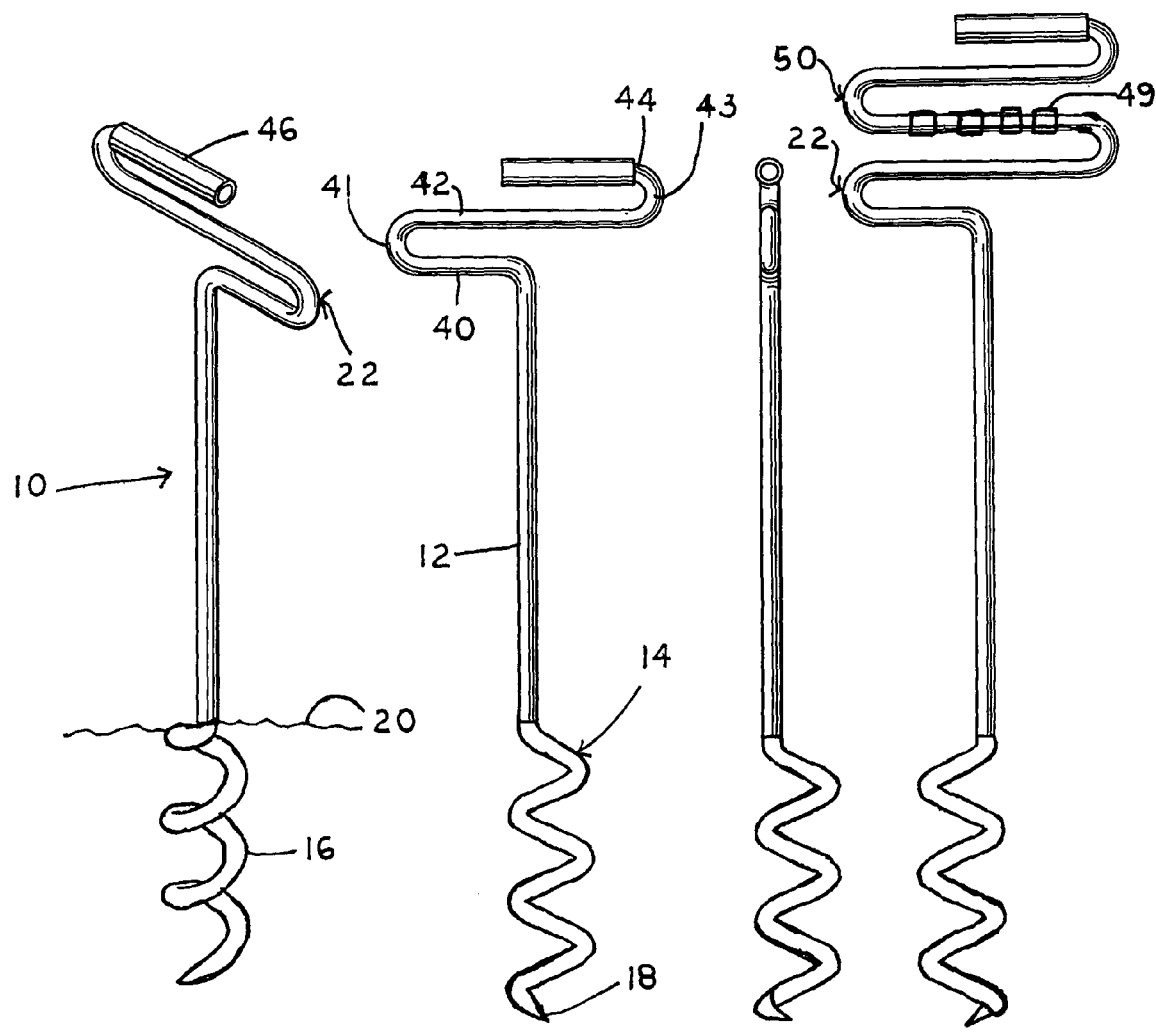
FIG. 1 is a perspective view of the rotary auger bow stand showing the spiral auger extending from the lower distal end of the vertical support rod or shaft and the bow rest and integral handle extending from the upper portion of the shaft.
FIG. 2 is a front view of the rotary auger bow stand of FIG. 1.
FIG. 3 is a left side view of FIG. 1.
FIG. 4 is a alternate embodiment of the rotary auger bow stand including a second loop for cooperatively engaging a portion of the bow arm.
Figure 5:
FIG. 5 is a top view of FIG. 1.
Figure 6:
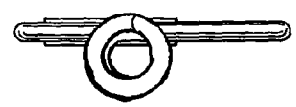
FIG. 6 is a bottom view of FIG. 1.

In accordance with the present invention, there is provided a rotary auger bow stand 10 which holds a bow in position above the ground for the intended user. The integral handle bow rest is located at an upper end of a shaft extending upwardly from a spiral auger wherein the handle bow rest can be bent at a selected angle to hold the bow in a selected position with respect to the surface of the ground.

The rotary auger bow mounting stand 10 provides a portable outdoor rest for removably holding a bow upright on the ground. The stand includes an above ground upright rod or shaft 12 having a bottom portion for insertion into the ground comprising a helical coil 16 or plurality of flights forming an auger 14 having a point 18 at the lower distal end to be fixedly and removably screwed into the ground 20 to support the stand 10 in an upright position. The top end of the rod 12 forming the stand body defines an S-shaped loop and bow rest 22 configured, sized and shaped and disposed at a selected angle ranging from 0 to 180 degrees from a vertical position to support an arm 30 of a bow 32 holding the bow in a substantially vertical position above the ground. The integral loop rest 22 which supports the is bow serves as a handle for the purpose of rotating the auger into the ground.

Figure 7:
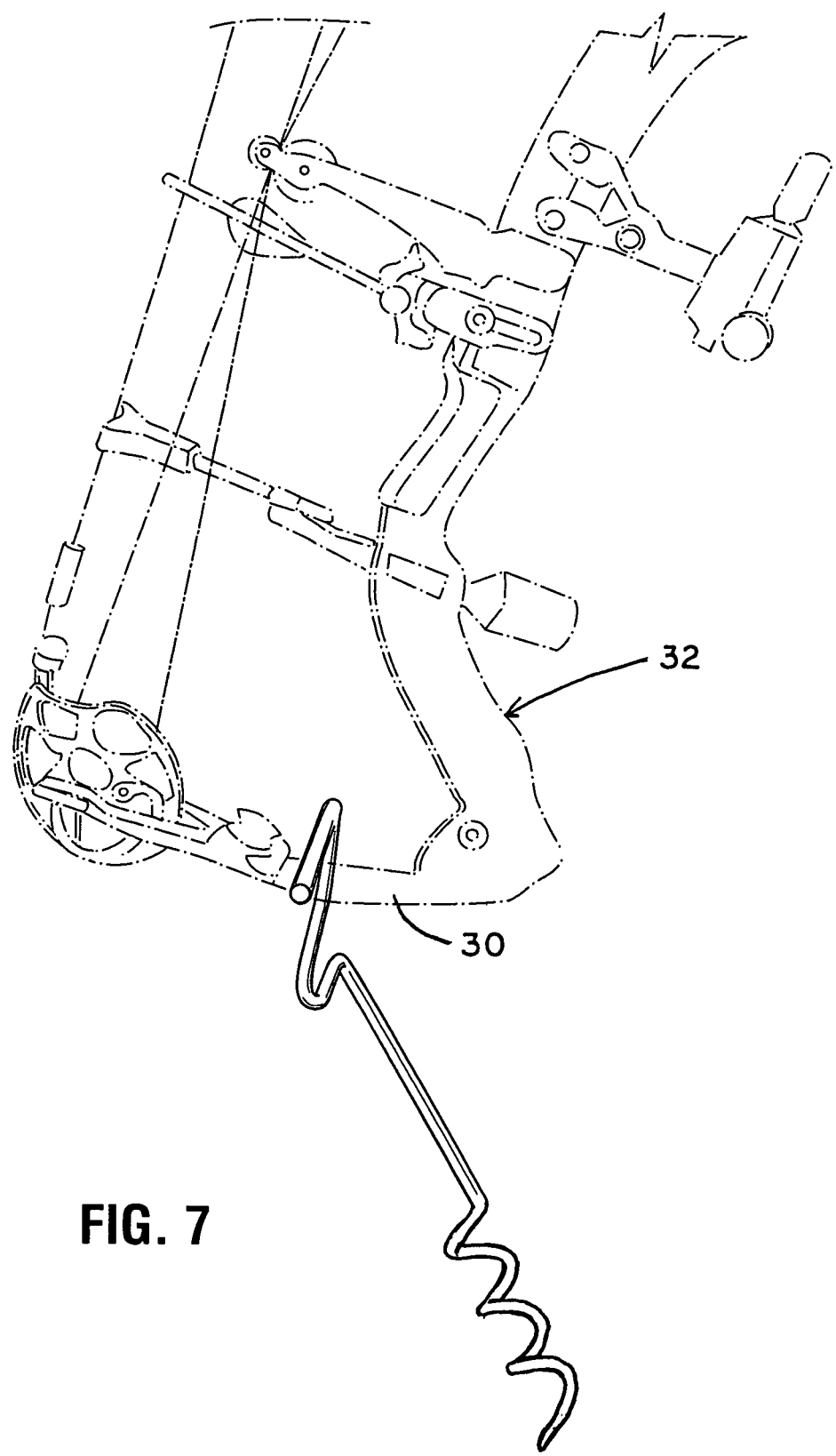
FIG. 7 is a perspective view of an alternate of the present invention showing the integral handle rest bent at a selected obtuse angle with respect to the shaft and showing a portion of the bow arm supported by the rest in a vertical position with respect to the ground.
Figure 8:
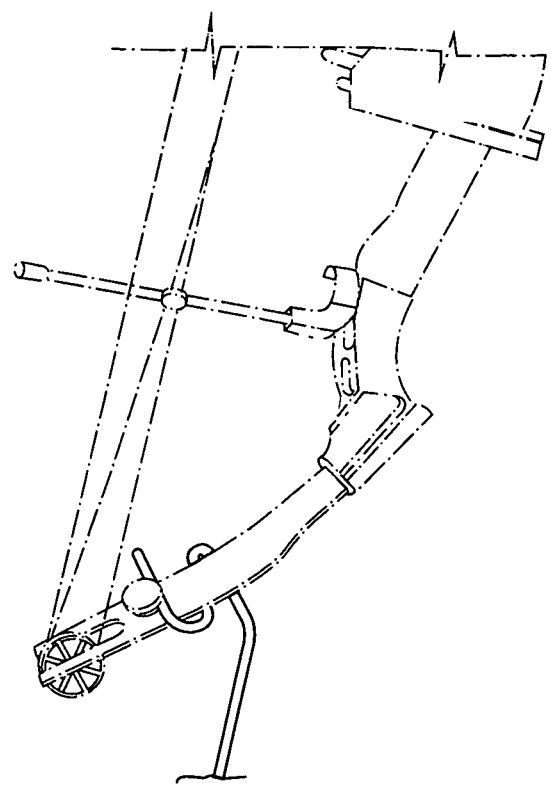
FIG. 8 is a perspective view of an alternate of the present invention showing the integral handle rest bent at a selected angle normal to the shaft and showing a portion of the bow arm supported by the rest in a vertical position with respect to the ground.
Figure 9:
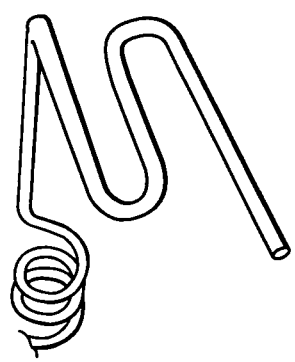
FIG. 9 is a perspective view of an alternate of the present invention showing the integral handle rest bent at a selected angle normal to the shaft.

The integral crank handle rest 22 supports an arm of a bow substantially vertically with respect to the ground. As shown in FIG. 7, a compound bow is removably held in position whereby the weight of the bow is supported by an S-shaped loop. The handle rest loop 22 includes a first portion 40 which extends outwardly from the rod 12 at a selected angle which is shown in the Figures to be a right angle or 90 degree angle. A second portion 42 extends upwardly over, spaced apart from and in alignment with the first portion forming a curved or bent portion 41 and extends past the shaft 12 a selected equal distance from the shaft 12. A third top portion 44 extends upwardly over, spaced apart from and in alignment with the second portion forming a curved or bent portion 43 and extends to the shaft 12. It is contemplated that one or more additional loops such as a second loop 50 could be added to the first loop 22 to provide means for holding an additional bow. Moreover, the additional loop 50 could be spaced apart a selected wider or more narrower distance than the first loop 22 in order to provide variable means for holding an arm of a bow at a selected angle with respect to the ground as shown best in FIG. 4.

A sound dampening sleeve 46 composed of a fabric, polymer, rubber, or elastomer to cover a selected portion of the bow handle rest 22, 44. Moreover, the sleeve may be comprised of a plurality of bands 49 such as rubber bands, tape, tube, hose or combinations thereof which to enhance the frictional engagement of the bow arm against the other material by reducing slippage.

The rotary auger bow stand has a medial portion comprising an elongated rod and a bottom portion comprising a helical spiral coil having a point extending downward from the elongated rod for a selected distance for penetration into the ground. The top portion defines a bow arm rest support comprising at least one curved "S" shaped loop portion extending upwardly from a top distal end of the elongated rod, the "S" shaped loop portion including a first straight section extending outwardly from the elongated rod at a selected angle from the top distal end of the elongated rod. A first curved end section extends from a distal end of the first straight section returning 180 degrees extending inwardly toward the elongated rod forming a second straight section spaced apart, parallel, and in alignment with the first straight section extending past the elongated rod. A second opposing curved end section returns 180 degrees extending inwardly forming a third straight section extending from the second opposing curved end section spaced apart, parallel, and in alignment with the first straight section and the second straight section.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A rotary auger bow stand comprising: a medial portion comprising an elongated rod;
   a bottom portion comprising a helical spiral coil having a point extending downward from said elongated rod for a selected distance for penetration into the ground;
   and a top portion defining a bow arm rest support comprising at least one curved "S" shaped loop portion including a first straight section extending outwardly from said elongated rod at a selected angle from said top distal end of said elongated rod, a first, curved end section extending from a distal end of said first straight section returning 180 degrees extending inwardly toward said elongated rod forming a second straight section spaced apart, parallel, and in alignment with said first straight section extending past said elongated rod, and a second opposing curved end section returning 180 degrees extending inwardly forming a third straight section extending from said second opposing curved end section spaced apart, parallel, and in alignment with said first straight section and said second straight section.

2. The rotary auger bow stand of claim 1, wherein a top distal end of said bow rest extends inwardly toward said medial section to a position in alignment therewith.

3. The rotary auger bow stand of claim 1, wherein said medial section, said bow supporting section, and said bottom section are integrally formed from a single elongated rod.

4. The rotary auger bow stand of claim 1, wherein said bow rest includes at least one sound dampening sleeve composed of material selected from the group consisting of a fabric, a polymer, a rubber, an elastomer, and combinations thereof for covering a selected portion of said bow rest.

5. The rotary auger bow stand of claim 1, wherein said bow rest includes an additional loop for holding an arm of an additional bow.

6. The rotary auger bow stand of claim 5, wherein said additional loop is spaced apart from said at least two opposing looped sections at a selected width forming a wider or narrower loop.

7. The rotary auger bow stand of claim 1, wherein said bow arm rest support is bent at an angle with respect to said elongated rod.

8. A rotary auger bow stand comprising: a medial section comprising an elongated vertical rod;
   a bow rest supporting section comprising a curved rod having at least one "S" shaped loop extending upwardly from atop distal end of said medial section comprising a rod having at least two opposing looped sections spaced apart from and in alignment with one another for receiving an arm of a bow, said at least two opposing looped sections including a first portion extending outwardly from said medial section at a right angle and a second portion extending upwardly over and spaced apart from and in alignment with said first portion forming a first curved loop extending past medial section a selected equal distance from said medial section and a third top portion extending upwardly over and spaced apart from and in alignment with said second portion forming a second curved portion extending a selected distance in alignment with said medial section; and
   a bottom section extending from a bottom distal end of said medial section, said bottom section comprising a helical spiral coil extending downward therefrom a selected distance including a tapered point for penetration into the ground.

9. The rotary auger bow stand of claim 8, wherein a top distal end of said bow rest extends inwardly toward said medial section to a position in alignment therewith.

10. The rotary auger bow stand of claim 8, wherein said medial section, said bow supporting section, and said bottom section are integrally formed from a single elongated rod.

11. The rotary auger bow stand of claim 8, wherein said bow rest includes at least one sound dampening sleeve composed of material selected from the group consisting of a fabric, a polymer, a rubber, an elastomer, and combinations thereof for covering a selected portion of said bow rest.

12. The rotary auger bow stand of claim 8, wherein said bow rest includes an additional loop for holding an arm of an additional bow.

13. The rotary auger bow stand of claim 8, wherein said bow rest supporting section is bent at an angle with respect to said elongated vertical rod.

14. The rotary auger bow stand of claim 12, wherein said additional loop is spaced apart from said at least two opposing looped sections at a selected width forming a wider or narrower loop.

\* \* \* \* \*